United States Patent
Chaudhari et al.

(10) Patent No.: US 11,615,487 B2
(45) Date of Patent: Mar. 28, 2023

(54) ESTIMATING PERFORMANCE OF PHOTOVOLTAIC SYSTEMS

(71) Applicant: SUNPOWER CORPORATION, San Jose, CA (US)

(72) Inventors: Chetan Chaudhari, Richmond, CA (US); Tamir Lance, Los Gatos, CA (US); Amir Asgharzadeh Shishavan, Iowa City, IA (US)

(73) Assignee: SUNPOWER CORPORATION, San Jose, CA (US)

( * ) Notice: Subject to any disclaimer, the term of this patent is extended or adjusted under 35 U.S.C. 154(b) by 431 days.

(21) Appl. No.: 16/813,285

(22) Filed: Mar. 9, 2020

(65) Prior Publication Data

US 2020/0294160 A1   Sep. 17, 2020

Related U.S. Application Data

(60) Provisional application No. 62/965,621, filed on Jan. 24, 2020, provisional application No. 62/818,408, filed on Mar. 14, 2019.

(51) Int. Cl.

| | |
|---|---|
| *G06Q 50/06* | (2012.01) |
| *H02J 3/00* | (2006.01) |
| *G06F 30/27* | (2020.01) |
| *G06F 9/54* | (2006.01) |
| *G06Q 10/06* | (2012.01) |
| *G06Q 30/04* | (2012.01) |
| *H02J 3/38* | (2006.01) |
| *G01W 1/02* | (2006.01) |

(Continued)

(52) U.S. Cl.
CPC ............ *G06Q 50/06* (2013.01); *G06F 9/54* (2013.01); *G06F 30/27* (2020.01); *G06Q 10/067* (2013.01); *G06Q 30/04* (2013.01); *H02J 3/004* (2020.01); *H02J 3/381* (2013.01); *G01W 1/02* (2013.01); *G06N 5/04* (2013.01); *H02J 2203/20* (2020.01); *H02J 2300/26* (2020.01)

(58) Field of Classification Search
CPC ........ G06Q 50/06; G06Q 30/04; G06F 30/27; G06F 9/54; H02J 2300/26; H02J 2203/20; G01W 1/02; G06N 5/04
USPC ........................................... 705/34
See application file for complete search history.

(56) References Cited

U.S. PATENT DOCUMENTS

| | | | |
|---|---|---|---|
| 9,590,425 B2 * | 3/2017 | Abido ..................... | H02J 3/381 |
| 9,740,803 B2 * | 8/2017 | Hoff ........................ | H02J 3/466 |

(Continued)

OTHER PUBLICATIONS

Extended European Search Report dated May 19, 2020 in European Application No. 20162673.6.

(Continued)

*Primary Examiner* — Md Azad
(74) *Attorney, Agent, or Firm* — Xsensus LLP

(57) ABSTRACT

An energy evaluation system includes an energy system modeling framework and an Application Program Interface (API) as part of the energy system evaluation framework. The energy evaluation system can be configured to query a simulation application program interface (API) with PV system configuration parameters as arguments, generate a shade loss time series based on the system configuration parameters, simulate energy output for the PV system based on the shade loss time series, and output energy aggregations based on the simulation.

18 Claims, 9 Drawing Sheets

(51) Int. Cl.
   *G06N 5/04*      (2006.01)
   *G06Q 10/067*    (2023.01)

(56) References Cited

U.S. PATENT DOCUMENTS

| | | | | |
|---|---|---|---|---|
| 2012/0310427 | A1* | 12/2012 | Williams | H02J 13/00002 |
| | | | | 702/182 |
| 2015/0069840 | A1* | 3/2015 | Teo | G05F 1/67 |
| | | | | 307/52 |
| 2016/0140258 | A1 | 5/2016 | Morse et al. | |
| 2016/0140283 | A1* | 5/2016 | Morse | G06Q 50/06 |
| | | | | 716/135 |
| 2017/0104447 | A1* | 4/2017 | Bintz | G08B 21/182 |
| 2019/0197203 | A1* | 6/2019 | Catthoor | G01W 1/12 |

OTHER PUBLICATIONS

Meyers Bennet et al.: "A fast parameterized model for predicting PV system performance under partial shade conditions", 2016 IEEE 43rd Photovoltaic Specialists Conference (PVSC), IEEE, Jun. 5, 2016, pp. 3173-3178, XP033008252, DOI: 10.1109/PVSC.2016.7750251, [retrieved on Nov. 18, 2016].

Dzung D Nguyen et al.: "Solar Photovoltaic Array's Shadow Evaluation Using Neural Network with On-Site Measurement", Electrical Power Conference, 2007. EPC 2007. IEEE Canada, IEEE, Piscataway, NJ, USA, Oct. 25, 2007, pp. 44-49, XP031252676, ISBN: 978-1-4244-1444-4.

Communication Pursuant to Rule 69 dated Sep. 21, 2020 in European Application No. 20162673.6.

* cited by examiner

ESTIMATING PERFORMANCE OF PHOTOVOLTAIC SYSTEMS

CROSS-REFERENCE TO RELATED APPLICATION

This application claims the benefit of U.S. Provisional Application No. 62/818,408, filed Mar. 14, 2019 and U.S. Provisional Application No. 62/965,621, filed Jan. 24, 2020, which are incorporated herein by reference in their entirety.

BACKGROUND

A component of Photovoltaic (PV) performance models is converting optical availability of resources to electrical response. PV modeling tools can provide a model chain of functions for calculating representative system response with support for select PV system layouts. Typically, PV performance modeling tools model the energy output of a given PV system for a unit, such as a single module or a row of modules and make an approximation that the output of the system scales with the increasing system size. While some of the factors affecting the output of a PV system do scale with the system size, other factors do not. These non-scaling factors reduce the accuracy of the estimated energy yield.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY

According to aspects of the disclosed subject matter, an energy evaluation system can include an energy system modeling framework and an Application Programming Interface (API) as a part of the energy evaluation framework. The energy system modeling framework can be configured to be queried through the API with PV system configuration parameters as arguments including a shade loss timeseries generated by external shade modeling tools, and output energy aggregations are returned to the user as results in the desired format.

Additionally, in one aspect, an energy evaluation framework can include processing circuitry configured to receive system configuration parameters for an energy system from an Application Program Interface (API), generate a 3D site geometry based on the system configuration parameters, with the help of a relevant weather file for the system configuration calculate an effective irradiance (Ee) for photovoltaic (PV) modules in the energy system, calculate inverter-level Power Maximum Power Point ($P_{mp}$), make adjustments to the $P_{mp}$ as per expected electrical load conditions and grid integration requirements, calculate energy yield information for the energy system, and return the energy yield information to the API.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
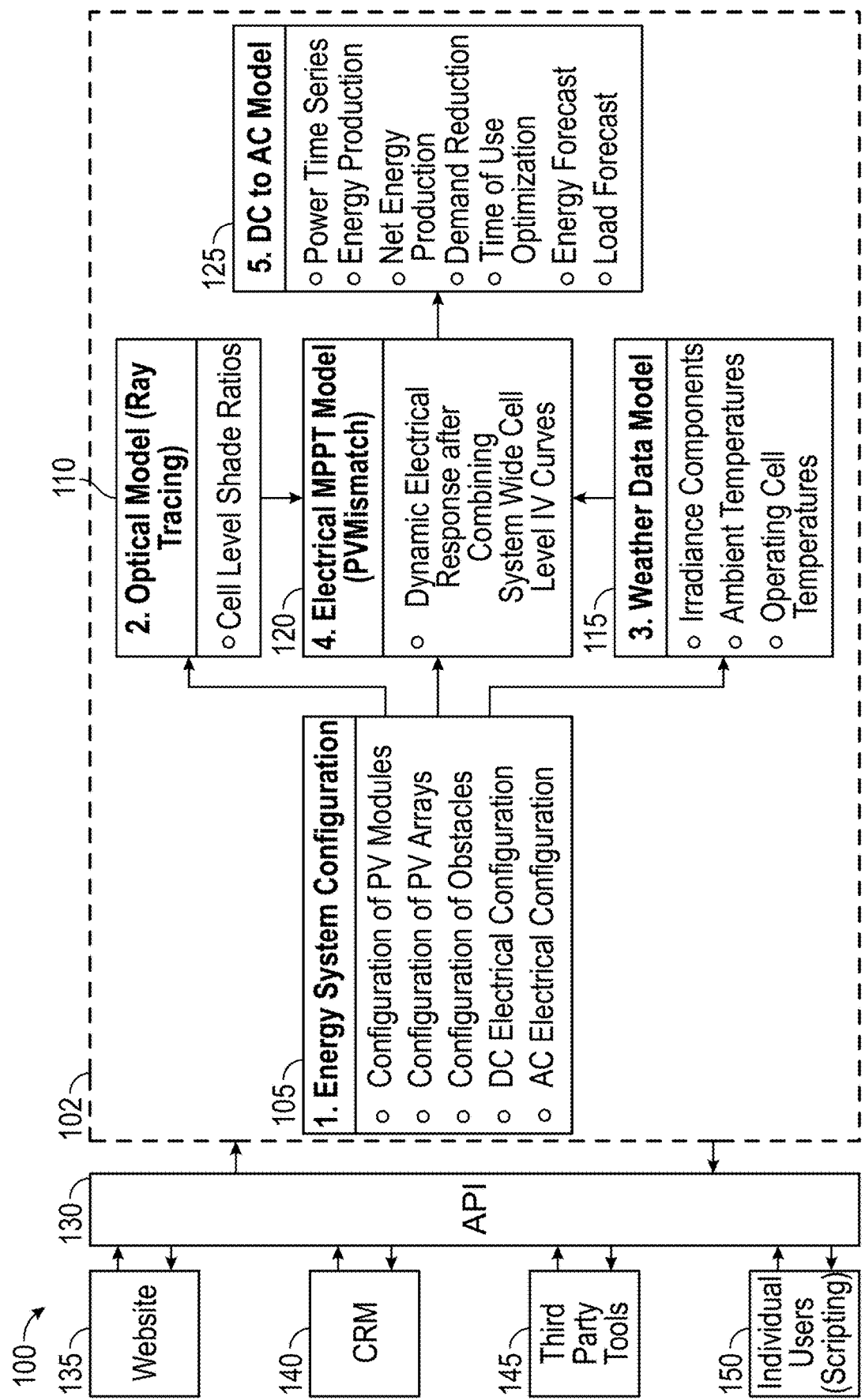
FIG. 1 illustrates an exemplary PV modeling system according to one or more aspects of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom,"

"front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Referring now to the drawings, like reference numerals designate identical or corresponding parts throughout the several views.

Conventionally, the energy yield generated by a PV system is generally considered to be proportional to available collector surface area. Starting with this general approximation, conventional PV system models account for various loss mechanisms to improve the energy yield predictions. For example, these models can be used to determine the net present value of PV projects (which can include the future value of PV projects, for example)—expressed as the predicted energy yield—and to evaluate measured performance of installed PV systems. By extension, the models can influence how PV technologies and projects are perceived by the financial community in terms of investment risk. Accordingly, increasing confidence in the accuracy of performance models is desired.

PV systems (e.g., commercial, residential, etc.) are increasingly being designed in complex shading conditions, and this complex shading results in electrical mismatch throughout an array and leads to loss in system power. Complex shading conditions combined with mismatches due to balance of system impedances can lead to compounded system level performance losses. Existing approaches use several coarse approximations in performance estimation of PV energy systems. Typically, in these tools, shade loss is calculated by performing geometric projections of shade by taking the relative positions of obstacles and layout of a PV array itself into consideration. The shade projections are converted to reduction in surface area of PV modules under illumination and the shade loss is deemed to be equivalent to the loss of area under illumination. However, as a result, these solutions cannot serve the wide variety of possible shading scenarios and are limited to only a handful of configurations of PV systems.

Shading losses and balance of system impedance losses are typically calculated as multipliers with the approximation that the varied loss factors are additive. Compounding the mismatch losses requires explicit calculation of current-voltage (IV) characteristics of PV cells for given environmental conditions that introduce losses. Then, compounding the mismatch losses also requires synthesizing an aggregate system response by series and parallel addition of individual exponent IV characteristics following an arrangement of cells in an electrical circuit. Conventional tools do not have consideration for this compounding effect of losses and can result in lower accuracy of estimated results. Further, for PV systems that operate off the Maximum Power Point ($P_{mp}$) to represent the PV inverters under power curtailment or voltage clipping is conventionally not considered in estimating energy yield of PV systems in conventional tools.

Further, the modern electrical grid is evolving at a rapid pace and the quickly increasing PV systems deployment means the electrical grid has variable sources of energy distributed throughout the grid. To safeguard any potential instabilities induced due to this, the regulatory compliances on PV systems are increasingly demanding to meet certain smart grid requirements for operation. These safeguards may include curtailing, load management, energy storage, time of use control, and various other factors that the PV systems need to get integrated with. Existing modeling approaches approximate these constraints either in the form of constant scalers to adjust energy output or not at all.

Because shade losses in PV systems can account for the largest fraction of annual energy loss, modeling shade loss accurately ensures a bankable PV system that reduces financial risk for PV developers, installers, and financiers. Conventional tools for PV modeling do not account for shade loss resulting from electrical mismatch in the system. Electrical mismatch between sub-module cell strings, between modules in a string, and between strings on single inverter MPPT can result in additional losses in system power output ranging up to 90% under certain environmental conditions. These loses can reduce the annual energy yield by 5% to 25%, for example, in addition to energy reduction caused by the optical shade losses.

Conventionally, the solar industry has focused on annual energy as a metric of performance. With rapidly increasing solar coupled energy storage opportunities, serving the customer needs for energy arbitrage focusing on annual energy as a metric of evaluation is not always adequate. Depending on what time of the day energy from the solar PV system is available to charge the storage solutions can heavily influence the project economics of a solar and solar storage offering. Shade losses are typically encountered in mornings and evenings, depending on the relative location of the obstacles, and can dramatically reduce the available solar energy to charge the storage solutions during these periods. Further, typical load demand of facilities is generally the greatest during afternoon periods of high shade potential. Additionally, a quick survey of PG&E tariffs shows that demand and energy charges are typically the highest in the evening periods (e.g., 4:00 PM to 9:00 PM). These factors make accurate quantification of shade on a solar PV system even more important to the viability of solar offerings in the solar and solar storage space.

Beyond optical shade loss, opto-electrical shade loss (i.e., optical loss and resulting electrical mismatch loss) reduces the PV array output further due to mismatch in output current and voltage of PV cells and their electrical combinations as cell strings, modules, and strings. This loss mechanism, while largely correlated to the optical loss, is also sensitive to the shade distribution and stringing between modules and inverters in the array. The compounded effect of optical loss and shade distribution results in a non-linear relationship between illuminated collector surfaces and electrical power at the output of the inverters.

For example, a PV module is an electric circuit of PV cells connected in series and parallel. In one aspect, all PV cells in a PV module can be connected in series in groups (e.g., 24, 48, 24 cells) with a bypass diode (e.g., added for shade tolerance) across each of these groups, which can be referred to as cell strings. PV cells can be a current source or a voltage source depending on the operating point of the PV module as defined by the load, typically the inverter. Reduction in irradiance on a subset of cells due to various shading obstructions (e.g., trees, nearby structures, other PV modules, etc.) causes the short circuit current and the open circuit voltage of the affected cells to change. While the diffuse component of irradiance is still incident on shade affected cells, compared to a strong direct component of irradiance, these cells can produce lower short circuit current. This leads to a condition where the output voltage or current of these cells is "mismatched." However, by series circuit law, and since all the cells can be connected in series, all the cells in the electrical circuit of the module must be equal to the output current of the cell with the lowest output current. This current reduction in unshaded cells occurs by shifting their operating points to higher output voltages. As a result, unshaded cells are forced to change their operating point to a lower output current and compensating higher output voltage, which produces less power than an unshaded circuit of cells. Consequently, there is a reduction in the maximum PV module power produced due to this electrical mismatch in addition to the power lost due to loss of illuminated collector surface. At string level, this same loss mechanism is observed when output currents of the modules are mismatched, resulting in higher system level loss due to electrical mismatch.

Accordingly, a comprehensive energy modeling platform, as described further herein, that integrates a solar energy system layout design tool, a PV energy simulation engine, and a machine learning based opto-electrical shade loss model, is desired to improve accuracy in PV modeling, for example.

FIG. 1 illustrates an exemplary PV modeling system 100 (also referred to as system 100) according to one or more aspects of the disclosed subject matter. In one embodiment, the PV modeling system 100 includes a PV modeling framework 102 (also referred to as framework 102). The framework 102 is an integration of various physics based models such as geometrical models that define PV array layouts, optical ray tracing models that calculate cell level effective incident irradiance, weather models that yield highly localized components of plane of array irradiance and cell temperatures, and electrical models that dynamically calculate the maximum power output of the PV system at any given instance. The model chain is highly scalable for system size and can integrate desired interval of energy yield. FIG. 1 shows the architecture of the model chain and the various component models that enable calculation of annual energy production.

The PV modeling framework 102 can include an energy system configuration 105, an optical model 110 (e.g., ray tracing), a weather data model 115, an electrical Maximum Power Point Tracking (MPPT) model (PV Mismatch) 120, and a DC to AC model 125 (e.g., annual energy output). The system 100 can also include an application program interface (API) 130 in communication with the framework 102. Additionally, the API 130 can be in communication with a website 135, a customer relations management (CRM) tool 140, third party tools 145, and/or individual users (scripting), for example. As a result, users can define a PV energy system based on system configuration parameters and pass the configuration as a request to the API 130 for the framework 102.

The following is an exemplary list of typical inputs to the PV energy system:
1. Energy System Configuration
   a. Site location (latitude and longitude)
   b. Cell technology thermal and electrical parameters
   c. Cell material properties
   d. Module materials properties
   e. Bypass device configurations
   f. Location of PV modules
   g. Array tilt
   h. Array Azimuth
   i. Mapping of physical location to electrical circuit
   j. Ground coverage ratio
   k. Mounting technology
   l. Obstacle Location
   m. Obstacle material properties
   n. Obstacle evolution profile (estimated tree growth rate)
2. DC Electrical Circuit Configuration
   a. Series parallel connection layout
   b. DC wiring lengths and material properties
   c. Inverter curtailing constraints
3. AC Electrical configuration
   a. Smart grid constraints
   b. Storage configuration
   c. Smart grid operating constraints
   d. Electrical load profile
   e. Utility rate structure Generally, the framework 102 is a data processing and analysis software system for estimating and predicting performance parameters of solar energy systems (e.g., an array of PV modules). For example, the framework 102 can enable users to input a layout of solar modules and any obstacles that may cast shade on the solar modules (e.g., via the API 130). Using the input, the framework 102 can estimate and predict resulting aggregate electrical performance parameters over a desired interval of operation for a given location and weather conditions. Accordingly, the framework 102 has several advantages. For example, having a modern API like architecture can ease scaling and outreach of the method for a variety of applications. As further described herein, an advantage of the framework 102 includes not requiring approximations for calculating shade loss. Additionally, another advantage includes the framework 102 being usable with varied solar energy system designs, solar module variants, shading scenarios, and power conversion optima tracking methods, as well as supporting modern smart grid integration. Accordingly, the framework 102 can allow users to shorten product development cycles, reduce uncertainty in design decisions, lower the burden on test campaigns, and reduce the business risk for the solar industry overall.

More specifically, the framework 102 can utilize data from weather sources (e.g., the weather data model 115), use ray tracing techniques to calculate effective fractions of shade on each unit portion of a solar collector surface (e.g., the optical model 110), and calculate effective electrical current available for each cell after shading (e.g., electrical MPPT model 120). Additionally, the framework 102 can use the electrical MPPT model 120 to calculate an aggregated electrical response of the total electrical circuit formed by the solar cells of the solar energy system (including impedances of PV balance of system components and DC conductors, for example) and track the maximum power operating point ($P_{mp}$) of the aggregated electrical response according to a desired power converter operation profile. Finally, also using the electrical MPPT model 120, the $P_{mp}$ of the electrical system can be integrated over desired intervals to calculate an energy yield (e.g., daily, weekly, annually, etc.) of the solar energy system. The solar energy system can enable including an effect of an electrical load profile, storage, and smart grid constraints for a modern electrical grid operation.

In other words, the framework 102 allows users estimate power and energy production of energy systems (e.g., PV energy systems) for a variety of scenarios, resulting in accurate calculation of electrical response while also considering grid integration. Accordingly, the framework 102 can provide accurate estimation of performance parameters including power output and energy yield of any configuration of PV system under any given shading scenario and any balance of system layout with explicitly calculated electrical response and consideration for dynamic behavior with smart grid integration.

Additionally, it should be appreciated that the system can omit one or more of the aforementioned steps for meeting customized speed and/or performance requirements of a user.

The energy system configuration 105 can include a relative location of PV modules at a site, a configuration of PV arrays (e.g., an array tilt, an array azimuth, etc.), and electrical circuit layout (e.g., DC electrical configuration and AC electrical configuration), for example. As is described in more detail herein, the energy system configuration 105 can include at least part of the exemplary list of typical inputs to a PV energy system described herein. Additionally, as further described herein, the inputs can be used to generate a 3-dimensional (3D) site geometry (see FIG. 2), and then ray tracing techniques can be applied to the 3D site geometry to calculate cell level shade ratios.

The optical model 110 can correspond to a ray tracing technique used to calculate cell level shade ratios, for example, as further described herein.

The weather data model 115 can include calculating and/or receiving highly localized components of plane of array irradiance and cell temperatures based on a location of the energy system.

The electrical MPPT model 120 can calculate the electrical response to the given set of environmental conditions. Additionally, the electrical MPPT model 120 can allow users to configure cell string and bypass diode layouts on a PV module. Further, the electrical MPPT model 120 can allow users to model PV modules equipped with Module Level Power Electronics (MLPE) such as DC optimizers and microinverters.

Figure 2:
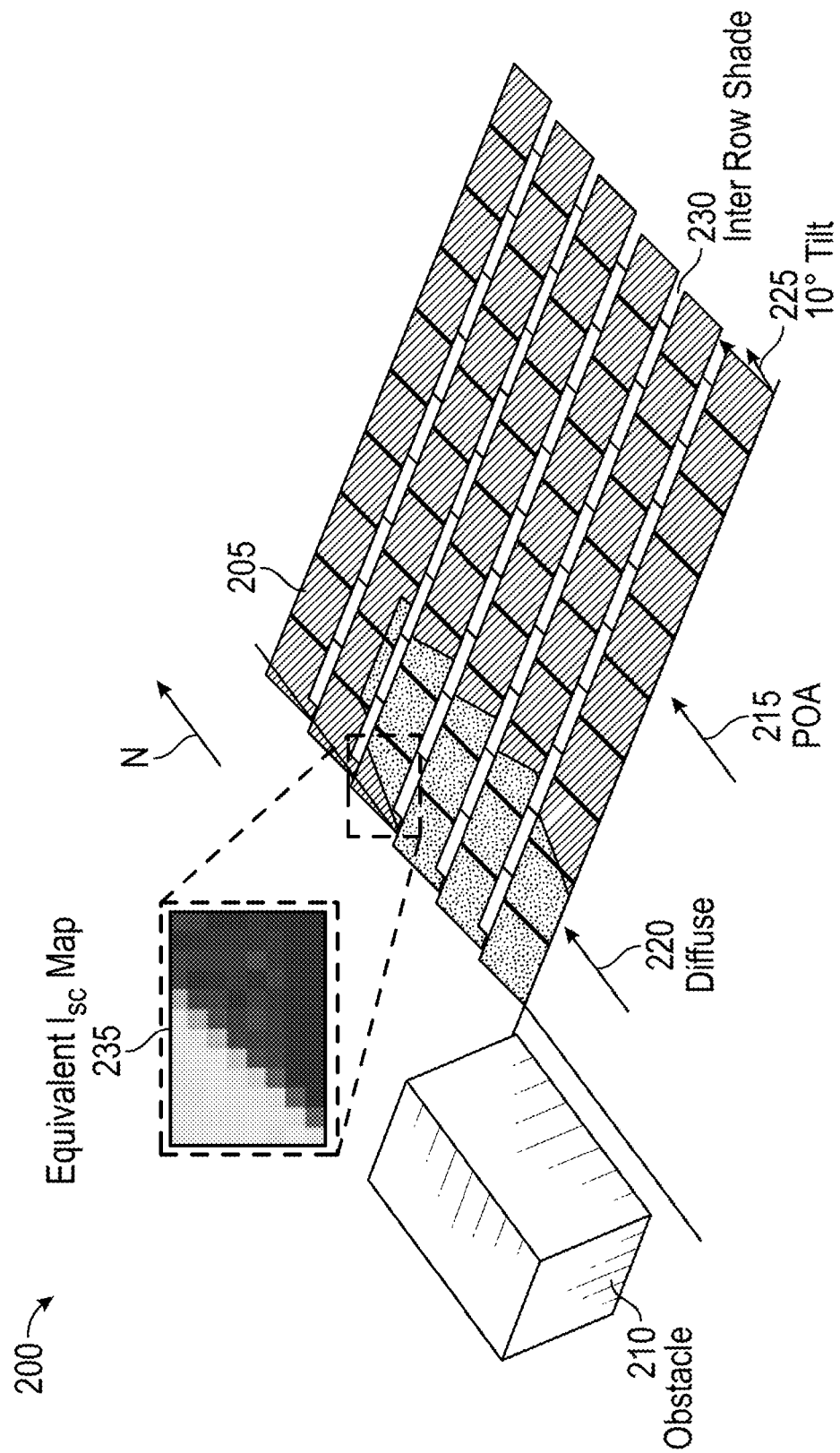
FIG. 2 illustrates an exemplary 3D site geometry according to one or more aspects of the disclosed subject matter.

FIG. 2 illustrates an exemplary 3D site geometry 200 according to one or more aspects of the disclosed subject matter. Generally, the list of typical inputs (described herein) used to define the PV energy system generates the 3D site geometry 200 for ray tracing techniques to calculate the cell level shade ratios. Here, simply for illustrative purposes in FIG. 2 and FIG. 3, the 3D site geometry 200 may be a ray traced scene from January $2^{nd}$ at 3:00 PM, which can be considered in addition to the energy system configuration 105. Additionally, Table 1 is an exemplary system configuration corresponding to FIG. 2.

TABLE 1

| System Configuration | |
| --- | --- |
| System size (kW) | 20 |
| PV module | SunPower E20-327 |
| Number of strings | 6 |
| Number of modules per string | 10 |
| Ground Coverage Ratio | 0.85 |
| Obstacle location | Southwest corner |
| Tilt angle (degree) | 10 |
| Azimuth (degree) | 0 (South) |
| Location | Richmond, CA |

Further, the 3D site geometry 200 can include a PV panel array 205 and an obstacle 210. Additionally, the 3D site geometry 200 can include derived inputs such as plane-of-array (POA) 215 and diffuse irradiances 220. The POA 215 and diffuse irradiances 220 can be from localized weather files, for example. The 3D site geometry 200 can also account for PV panel tilt 225 (the 3D site geometry in FIG. 2 may use a 10° tilt, for example) and inter row shade 230. FIG. 2 also illustrates a short circuit current ($I_{sc}$) map 235.

The 3D site geometry 200 can be used for ray tracing techniques to calculate the cell level shade ratios. Cell level shade ratios represent the variation of irradiance on a given PV cell, including shade from the obstacle 210 and inter row shade 230. These cell shade ratios, along with the irradiance and temperature yielded by the weather data model from the location information, are used to calculate effective irradiance (Ee) for each cell in PV modules across the system.

Ee for each cell is used in the PV Mismatch model chain by fitting an equivalent circuit model on the cell level. The short circuit current ($I_{sc}$) is scaled using Ee and Current-Voltage (IV), and Power-Voltage characteristics are calculated for each cell. Distribution of $I_{sc}$ can be seen in the $I_{sc}$ map 235. Along with the balance of system losses caused by the DC wiring and components including connectors and combiners, the PV Mismatch model chain aggregates the cell-level IV curves according to the electrical circuit configuration of the system by summing them in series and parallel combination. The DC electrical circuit can correspond to the series-parallel connection of PV modules feeding into a Maximum Power Point Tracking (MPPT) channel of a PV inverter. The MPPT model 120 then calculates the inverter-level Maximum Power Point ($P_{mp}$) to yield the power at $P_{mp}$ from the DC electrical circuit's combined Power-Voltage characteristics, taking the inverter operating constraints (if any), smart grid considerations (if any), and utility driven constraints (if any) into consideration. Finally, the framework 102 can aggregate $P_{mp}$ values over the desired time interval to calculate the energy yield of the PV system (e.g., the PV panel array 205). There is also a provision for modeling inverter behaviors on a DC and an AC side of the inverter, such as off $P_{mp}$ operation (which affects performance of PV systems), an effect of storage, and an effect of electrical load profile.

In other words, this particular 3D site geometry 200 demonstrates evening shade on a typical winter evening. The $I_{sc}$ map 235 shows an example of ray density across the PV module surface to its translation into equivalent L for each cell of the PV module. The individual $I_{sc}$ values for the entire PV system are passed to the electrical MPPT model 120 to synthesize the PV system level Power-Voltage curve for the various module variants along with an unshaded case for reference, as seen in FIG. 3.

The API 130 at the end of calculations can return any desired outputs such as power time series, annual energy, and financial impact to the user.

Figure 3:
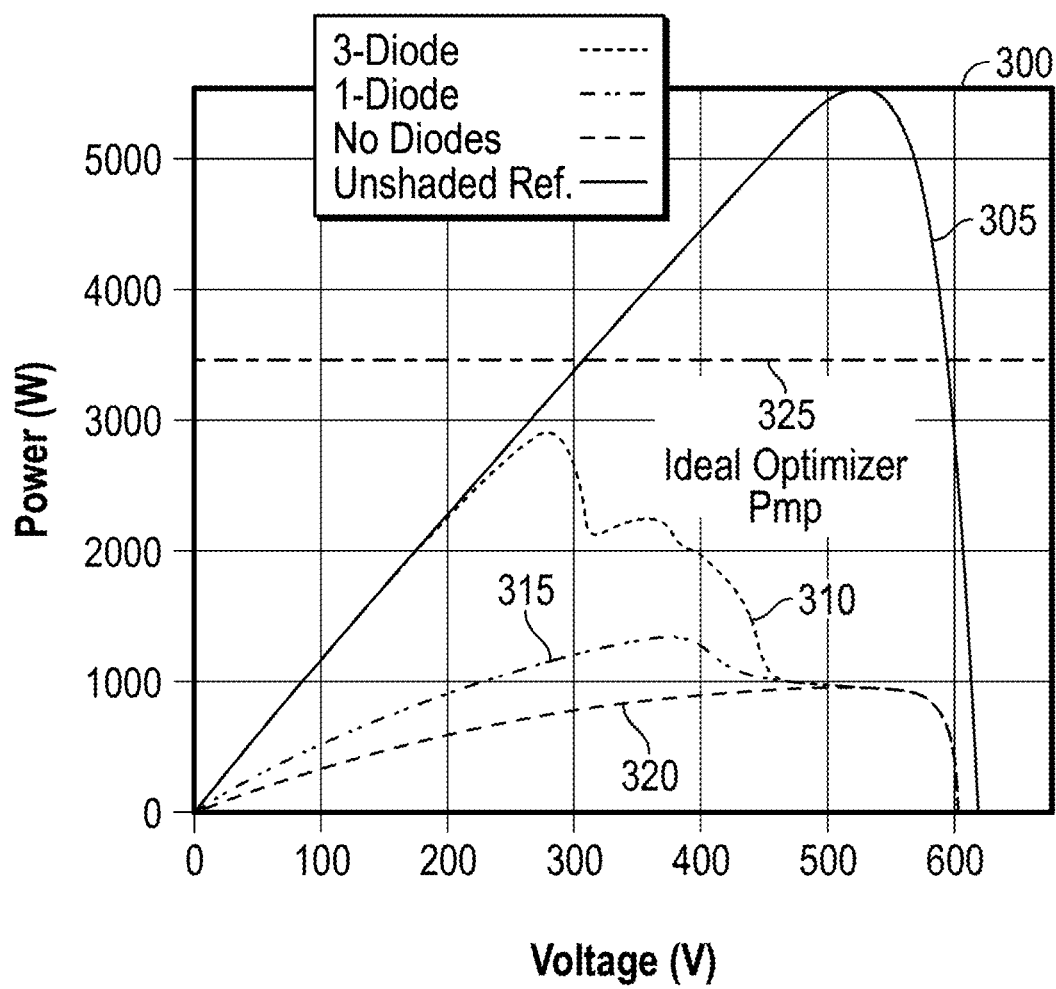
FIG. 3 illustrates a graph of system level aggregated power-voltage curves from the Maximum Power Point Tracking (MPPT) model according to one or more aspects of the disclosed subject matter.

FIG. 3 illustrates a graph 300 of system level aggregated power-voltage curves from the MPPT model 120 according to one or more aspects of the disclosed subject matter. The power-voltage curves include an unshaded reference curve 305, a 3-diode curve 310, a 1-diode curve 315, and no-diode curve 320. The graph 300 also includes an ideal optimizer $P_{mp}$ 325. The 3-diode curve 310 can be based on a 3-diode module which is a conventional module with three individual cell string and bypass diodes (one per cell string) isolating each of the cell strings. The 1-diode curve 215 can be based on a 1-diode module which corresponds to an arrangement where only one bypass diode serves the entire module. The no-diodes curve 320 can be based on a no-diodes configuration which is a module without any bypass diodes. The ideal optimizer $P_{mp}$ 325 indicates a lossless MLPE equipped module. The unshaded reference curve 305 corresponds to a reference scenario without any shading.

The MPPT model 120 can track the maxima of the system level power voltage curves dynamically by taking into account effects of inverter specific behaviors, such as global MPPT sweep. Accordingly, the MPPT model 120 can yield a $P_{mp}$ value to be integrated as an energy value over a desired time interval. For example, Table 2 shows a single winter day's aggregated energy yields calculated according to the method described herein.

TABLE 2

| Module Variants | 2$^{nd}$ of January Energy Yield (kWh) | Total Shade Loss (%) |
|---|---|---|
| $P_{mp}$ Ref (Unshaded) | 81.82 | 0.00 |
| $P_{mp}$ 3-diode | 56.09 | −31.45 |
| $P_{mp}$ 1-diode | 22.88 | −72.04 |
| $P_{mp}$ No diode | 21.17 | −74.12 |
| $P_{mp}$ Ideal DC optimizer | 60.37 | −26.21 |

The framework 102 includes several advantages. For example, modeling PV systems with the framework 102 can benefit the solar industry at every stage of the business value chain including new technology R&D, improved fleet diagnostics, boosted confidence in pre-sales support, improved bankability and ultimately its contribution towards lowering levelized cost of energy. Additionally, the framework 102 can calculate high resolution annual yields for a commissioned site and validate the results against operational data and results from other commercially available tools.

Figure 4:
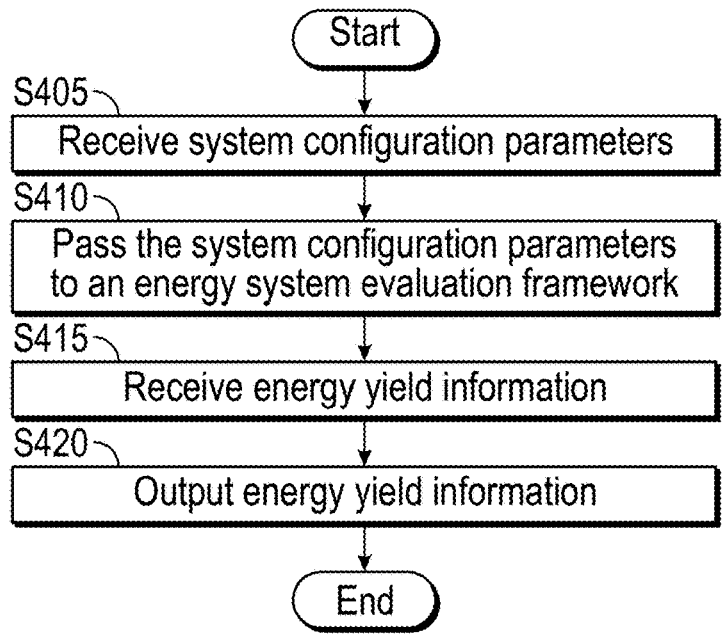
FIG. 4 is an exemplary algorithmic flow chart of a method for displaying energy yield information according to one or more aspects of the disclosed subject matter.

FIG. 4 is an exemplary algorithmic flow chart of a method for displaying energy yield information according to one or more aspects of the disclosed subject matter.

In S405, an API 130 can receive system configuration parameters for an energy system as a request to the API 130. The system configuration parameters can be defined by one or more categories of end users (e.g., the website 135, the CRM 140, the third-party tools 145, individual users 150, etc.), for example. Alternatively, or additionally, S405 can correspond to receiving system configuration parameters including shade loss time series.

In S410, the API 130 can pass the system configuration parameters (e.g., the system configuration parameters in S405) to an energy system evaluation framework (e.g., the framework 102). The system configuration parameters (also referred to herein as system configuration information) can correspond to at least part of the list of typical inputs to the PV energy system as further described herein.

In S415, the API 130 can receive energy yield information for a predetermined system configuration based on the request in S410.

In S420, the API 130 can output (e.g., display via a display) the energy yield information. As further described herein, the energy yield information can be an energy yield calculated for a specific system configuration over a predetermined time interval (e.g., one day, monthly, annually, lifetime etc.). After the API 130 outputs the energy yield information, the process can end.

Figure 5:
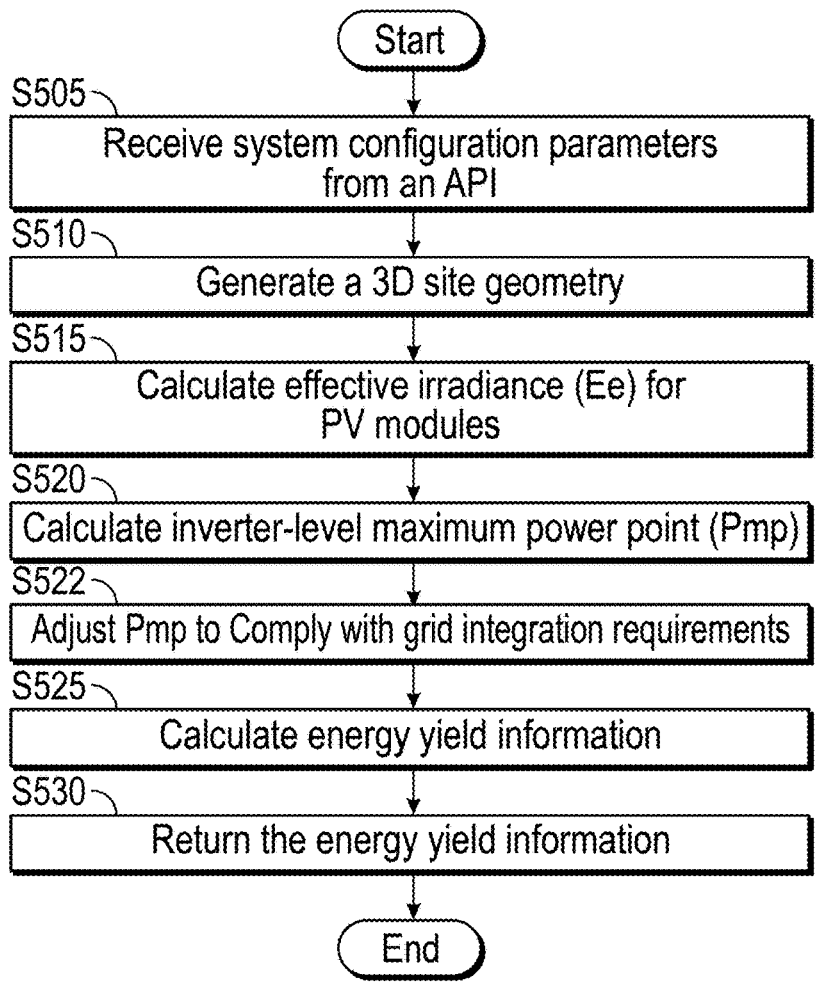
FIG. 5 illustrates an algorithmic flow chart of a method for calculating energy yield information according to one or more aspects of the disclosed subject matter.

FIG. 5 illustrates an algorithmic flow chart of a method for calculating energy yield information according to one or more aspects of the disclosed subject matter.

In S505, a PV modeling framework (e.g., the framework 102) can receive energy system configuration parameters from an API (e.g., the API 130). The received parameters from the API 130 can include system configuration information (e.g., the system configuration information in S410) which can define the energy system configuration 105.

In S510, the framework 102 can generate a 3D site geometry (e.g., 3D site geometry 200) using the optical model 110 based on the system configuration information (e.g., the energy system configuration 105). For example, as shown in FIG. 2, the 3D site geometry can be a PV energy system based on the system configuration information.

In S515, the framework 102 can calculate effective irradiance (Ee) for PV modules. For example, the Ee can be calculated across the system, for a subset of PV modules, for each cells in PV modules across the PV energy system. Additionally, the Ee can be assigned to specific PV modules. The Ee is calculated based on the cell shade ratios and the irradiance and temperature yielded by the weather data module 115.

In S520, the framework 102 can calculate inverter-level Maximum Power Point ($P_{mp}$) using the electrical MPPT model 120.

In S522, the framework 102 can adjust the $P_{mp}$ to comply with grid integration requirements. This adjustment can be performed by the DC to AC model 125. Adjusting the $P_{mp}$ to comply with grid integration requirements can safeguard against any potential instabilities. This also assists in meeting the regulatory compliances on PV systems to meet certain smart grid requirements for operation which are increasingly demanding. These safeguards may include curtailing, load management, energy storage, time of use control, and various other factors that the PV systems need to get integrated with.

In S525, the framework 102 can calculate energy yield information based on one or more of the energy system configuration 105, the optical model 110, the weather data model 115, and the electrical MPPT model 120. The energy yield information calculated by the framework 102 can be the energy yield of the energy system (e.g., the energy system defined by the request) over a desired time interval (e.g., day, week, month, year, etc.). The framework 102 can calculate the energy yield information by aggregating $P_{mp}$ values over the desired time intervals.

In S530, the framework 102 can return the energy yield information calculated in S525 to the API 130, for example. The energy yield information can be returned as a file, saved in the cloud, or rendered as a webpage, for example. After the framework 102 returns the energy yield information, the process can end.

Additionally, it should be appreciated that some of the steps can be optional based on the configuration of the framework 102. For example, the framework 102 may not include the optical ray model but can still calculate the energy yield of the energy system over the desired time interval.

Figure 6:
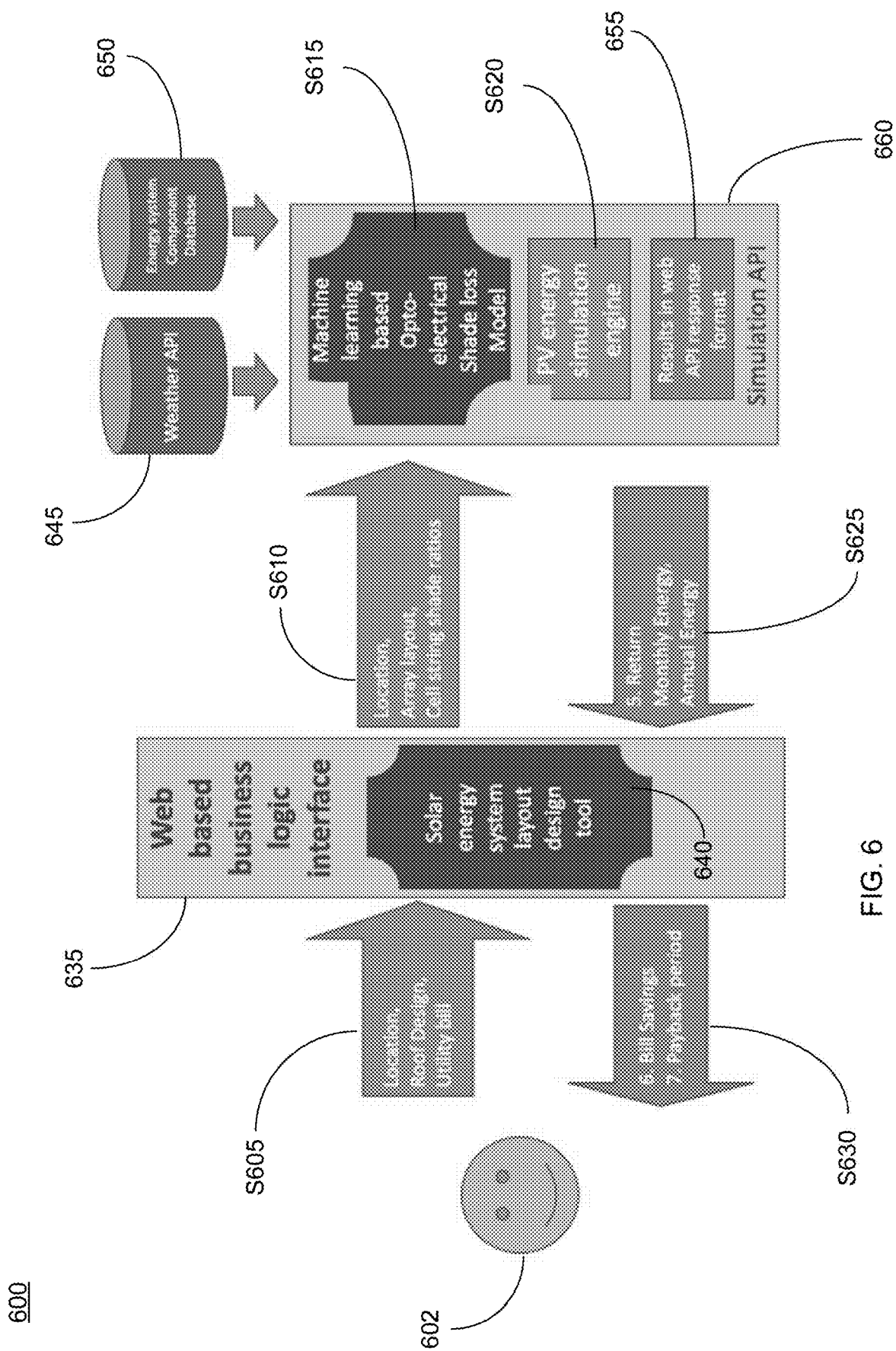
FIG. 6 illustrates an exemplary architecture for a PV modeling system according to one or more aspects of the disclosed subject matter.

FIG. 6 illustrates an exemplary architecture 600 for a PV modeling system (e.g., system 100) according to one or more aspects of the disclosed subject matter. For example, in one aspect, the architecture 600 can be configured to comprehensively predict energy for a PV system, including effects of electrical mismatch losses. Additionally, the architecture 600 can be configured to incorporate machine learning to assist in comprehensively predicting energy for the PV system without sacrificing speed. In one aspect, the architecture 600 can represent a data processing and analysis software system that a user can interact with via an electronic device (e.g., server, computer, laptop, smartphone, PDA, etc.) and the architecture 600 in general can be stored and executed on various servers and/or a virtualized set of cloud-based hardware resources, for example.

In S605, the architecture 600 can be configured to receive user input (e.g., from user 602) at a web-based business logic interface 635. The user input can include the location, design of the PV system array layout on the roof, and utility bill or electrical load information (e.g., via a solar energy system layout design tool 640). In one aspect, the solar energy system layout design and shade evaluation tool 640 can be SunPower's Instant Design.

In S610, the architecture 600 can be configured to query, via the solar energy system layout design tool 640, a simulation API 660. In one aspect, the simulation API 660 can be SunPower's PVAPI. More specifically, the architecture 600 can be configured to query the simulation API with the site location, solar panel array layout, and cell string level shade ratios as arguments to get the array layout specific weather timeseries.

In S615, the architecture 600, via the simulation API 660, can be configured to run a machine learning opto-electrical shade model to get a shade loss time series (e.g., hourly). To run the machine learning opto-electrical shade model, the architecture 600, via the simulation API 660, can be configured to fetch a weather file from a weather API 645 for the location along with the cell string shade ratios.

In S620, the architecture 600, via the simulation API 660, can be configured to run a PV energy simulation engine. To run the PV energy simulation engine, the architecture 600, via the simulation API 660, can be configured to fetch component definition files for the array layout (e.g., module parameters, inverter parameters, mounting structures specific considerations, etc.) from an energy system component database 650 and trigger the PV energy simulation engine. The PV energy simulation engine can apply the power loss due to shade calculated in S615 to the DC power available at the output of the PV array.

In S625, the web-based business logic interface 635 can receive the results of the PV energy simulation engine in the form of energy aggregations (e.g., hourly energy, monthly energy, annual energy, etc.). In other words, results of the simulation engine calculations through various PV performance models (e.g., via a trained machine learning model as further described in FIGS. 7 and 8) can be served from the simulation API 660 to the web-based business logic interface 635.

In S630, the architecture 600 can be configured to calculate the bill savings (and/or a payback period) using the energy yield aggregations, customer load profile, and the applicable tariffs. For example, the calculations can be performed by the web-based business logic interface 635. The final results in the form of bill savings (and/or the payback period) can be served back to the user 602 (e.g., displayed through the web-based business logic interface 635), for example. It should be appreciated that one or more of the steps S605-S630 can be incorporated into, combined with, and/or replace one or more of the steps in FIGS. 4 and 5.

Figure 7:
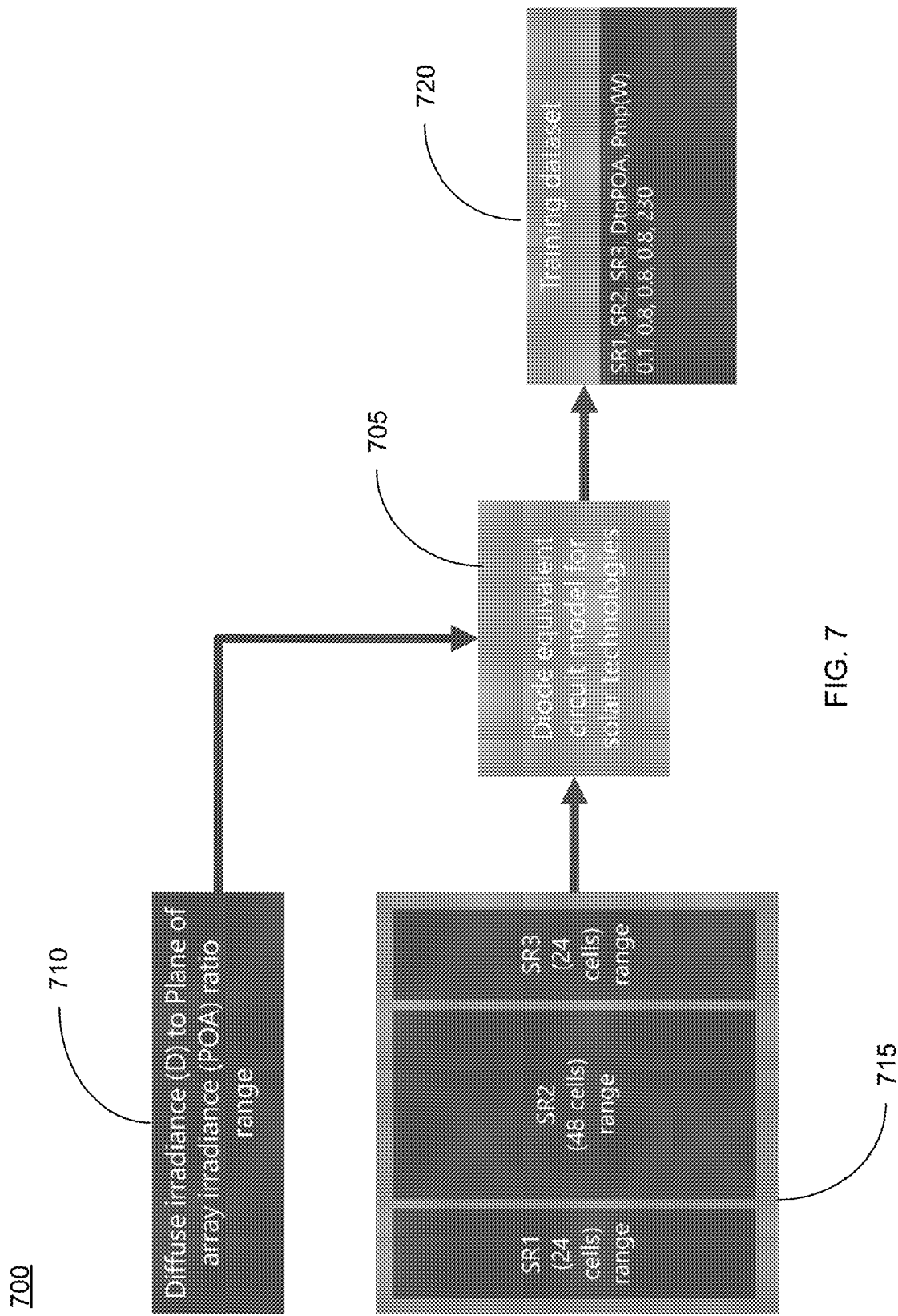
FIG. 7 illustrates an exemplary opto-electrical machine learning model training workflow according to one or more aspects of the disclosed subject matter.

FIG. 7 illustrates an exemplary opto-electrical machine learning model training workflow 700 according to one or more aspects of the disclosed subject matter. In one aspect, the opto-electrical model can take optical inputs from a ray tracer, a solar energy system layout design tool (e.g., the solar energy system layout design tool 640), and the like, to calculate the opto-electrical loss. A diode equivalent circuit model 705 for solar technologies can receive input from a diffuse irradiance (D) to plane of array irradiance (POA) ratio range 710 and a solar module 715. The D to POA ratio 710 can correspond to the ratio of diffuse sunlight to direct sunlight on the solar module. The solar module 715 can include sub-circuits including solar cells. For example, a first sub-circuit can be 24 cells, a second sub-circuit can be 48 cells, and a third sub-circuit can be 24 cells. Additionally, a shade ratio can correspond to each sub-circuit of solar cells. For example, the first sub-circuit of 24 cells can correspond to a first shade ratio (SR1), the second sub-circuit of 48 solar cells can correspond to a second shade ratio (SR2), and a third sub-circuit of 24 solar cells can correspond to a third shade ratio (SR3). In other words, the diode equivalent circuit model 705 can receive three numbers corresponding to shade ratios for the three sub-circuits from the solar module 715. However, it should be appreciated that solar module 715 is exemplary and other solar module types with different combinations of sets of solar cells can be contemplated.

Additionally, the diode equivalent circuit model 705 can receive the D to POA ratio range 710. According to this example, the D to POA ratio range 710 and the three shade ratios SR1, SR2, and SR3 (it should be appreciated that there could be more or less shade ratios corresponding to more or less sub-circuits in the solar module) can be fed into the diode equivalent circuit model 705 to generate a training dataset 720. The training dataset 720 can be a table, for example, including the three possible values for the shade ratios, all possible values for the D to POA ratio, and the $P_{mp}$ (W) (e.g., the output). In one example, SR1 can be 0.1, which can correspond to 90% of the first sub-circuit being shaded, SR2 can be 0.8, which can correspond to 20% of the second sub-circuit being shaded, and SR3 can be 0.8, which can correspond to 20% of the third sub-circuit being shaded. Additionally, the table can include the D to POA ratio, which can be 0.8, which can correspond to 80% direct sunlight compared to 20% diffuse sunlight. Under these exemplary circumstances, the output is 230 watts. The diode equivalent circuit model 705 can be run so that all possible combinations are included in the training and are output as a training data set 720. After all possible combinations are generated, inferences can be made in the opto-electrical machine learning model inference workflow 800 in FIG. 8 based on the training data sets 720. In other words, training the model 705 allows the architecture 600 to skip the time intensive calculation to determine the accurate $P_{mp}$ output.

Figure 8:
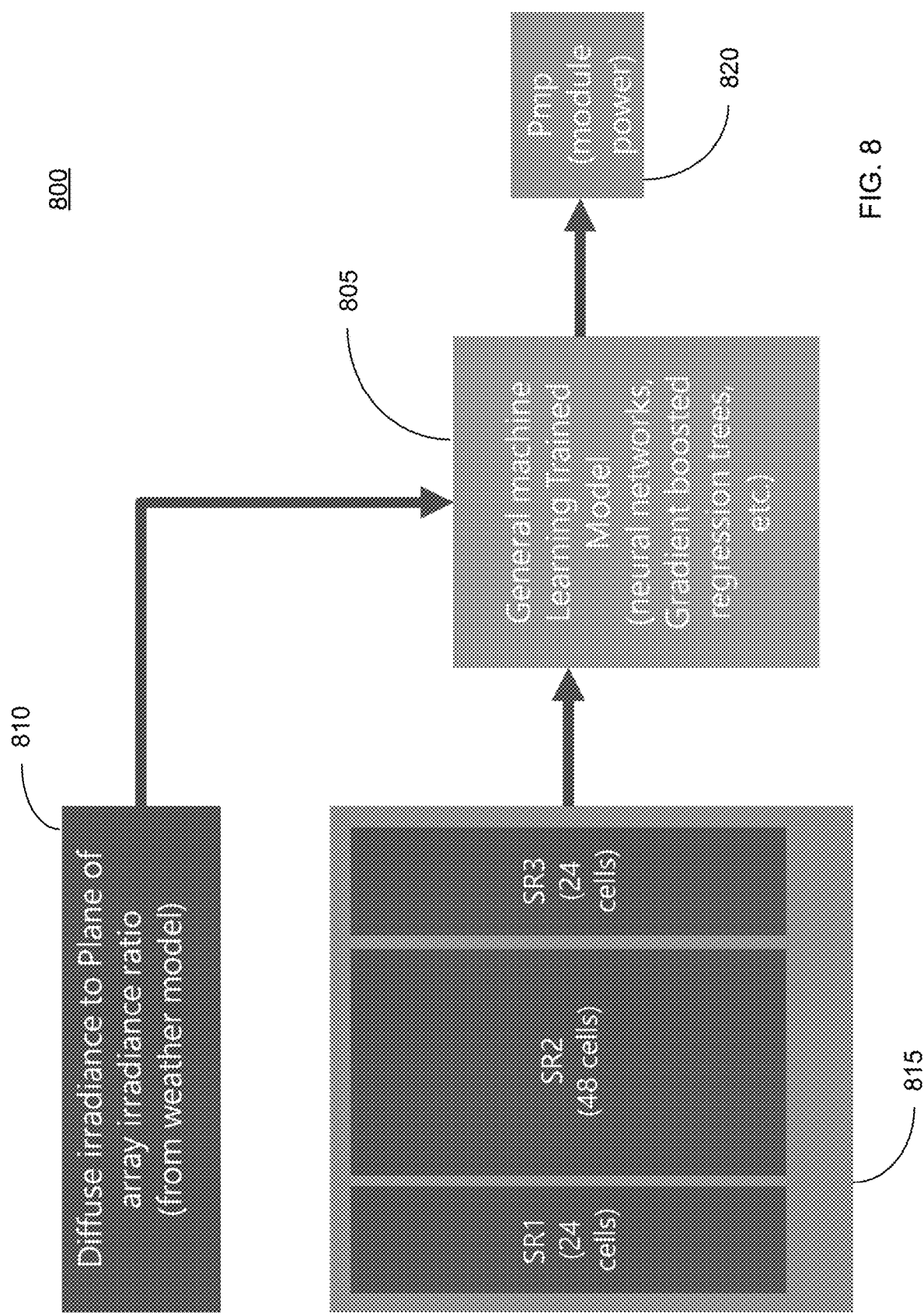
FIG. 8 illustrates an exemplary opto-electrical machine learning model inference workflow according to one or more aspects of the disclosed subject matter.

FIG. 8 illustrates an exemplary opto-electrical machine learning model inference workflow 800 according to one or more aspects of the disclosed subject matter. The workflow 800 can include a machine learning trained model 805. For example, the trained machine learning model 805 can have been trained by the opto-electrical machine learning model training workflow 700, for example. The trained machine learning model 805 can be a neural network, gradient boosted regression trees, and the like. The trained machine learning model 805 can receive a D to POA ratio 810 from a weather model (e.g., the weather API 645), for example. Additionally, the trained machine learning model 805 can receive shade ratios SR1, SR2, and SR3 from a solar module 815. Based on the received D to POA ratio 810 and the shade ratios from the solar module 815, the trained machine learning model 805 can output a corresponding module power ($P_{mp}$) 820. By using the trained machine learning model 805, the architecture 600 does not need to perform the time intensive calculation because the trained machine learning model 805 can recognize the input (e.g., D to POA ratio 810 and the shade ratios from the module 815) and generate the corresponding $P_{mp}$ output.

As has been described herein, the system 100 (and/or the architecture 600) can calculate the annual energy yield of a PV system given any configuration of PV system, shading conditions, environmental conditions, and electrical load profile, with the convenience of being accessible as a web API (e.g., the API 130) to serve various categories of end users. Accordingly, such a system can enable various advantageous applications. For example, the system 100 (and/or the architecture 600) can be used to study module design variants. More specifically, the system 100 (and/or the architecture 600) can be used to study effects of changing various properties of PV modules, as well as cell and cell string size, orientation, layout, and components. In other words, PV modules primarily use bypass diodes to mitigate reverse current operation of any of the cells due to mismatched incident light on cells. For example, referring again to FIG. 3, FIG. 3 illustrates calculating impact of changing the number of bypass devices in a PV module design. In this case, bypass diodes in three identical shade scenarios—3-diode (conventional PV module layout), 1-diode (cost optimized PV module layout), No diodes (removing all diodes)—with a reference "Unshaded" reference condition with 3-diode configuration. The maximum of each curve seen in FIG. 3 represents the MPP of each scenario. Summing the MPP values over the year under given input conditions, lets users compare the impact of choosing one bypass configuration over another, thereby eliminating a need for extensive and expensive field validation of the change in product.

Another application of the system 100 (and/or the architecture 600) is measuring degradation of materials and long-term reliability. Since the system 100 (and/or the architecture 600) can calculate the power dissipated in the cells (both in forward and reverse operation), it is also enables calculation of the normal operating temperature, as well as any temperature rise from reverse bias operation. This distribution of temperatures in combination with information about Ultra-Violet radiation (UV) exposure, ambient temperature, humidity, voltage bias, and experimentally calculated acceleration factors can be used to predict expected lifetime of the module materials and improve them. This information is vital for determining the appropriate warranty for a given product and can be used to take proactive measures on the installed fleet.

Another application for the system 100 (and/or the architecture 600) includes post commissioning optimization using unmanned aerial vehicle (UAV) mapping. For example, infrared (IR) optical image data gathered from UAVs (e.g., drones) or other measurement methods (e.g., array of temperature sensors) in combination with a machine learning approach can be used to fit the framework 102 (and/or the architecture 600) to field data in cases where detailed array layouts are not known beforehand. As a result, the system 100 (and/or the architecture 600) can optimize string layouts taking into account site specific shading losses which can be applied retroactively on the installed fleet opening new revenue generating business opportunities in the Operations and Maintenance space. IR drone data can be used to identify underperforming modules and strings, but with the system 100 (and/or the architecture 600), an array can be reconfigured to mitigate underperforming assets based on the optimization information provided by the system 100 (and/or the architecture 600). This significantly improves on conventional methods where the IR images in isolation can be used by customers to make warranty claims, but it is likely that new replacement modules will fall prey to the same hazards as the modules they replace, and overall system performance may not improve using the conventional methods.

The system 100 (and/or the architecture 600) can also be used for a variety of other advantageous applications. For example, the system 100 (and/or the architecture 600) can be used for the following:

Generate vital information for a sales process—such as performance metrics for a proposed energy system;

Study and compare effect of using various cell technologies and/or properties (e.g. different cell efficiencies, monocrystalline silicon solar cells, polycrystalline solar cells, front contact silicon solar cells, back contact silicon solar cells, thin film solar cells);

Study and compare effect of using various solar module material, configurations and/or properties (e.g. laminate materials, shingled front contact silicon solar modules, thin film solar modules, concentrated solar modules)

Study effect of using Module Level Power Electronics in PV systems such as DC optimizers, Microinverters, Rapid shutdown devices (module and string level);

MPPT model for modeling inverter behavior that changes operating point of the DC PV system such as curtailing;

Use electrical load profile to accurately assess the effect of introducing energy storage, studying smart grid features such as demand charge management, time of use shifting, Volt-VAR management, Microgrid feasibility;

Study shading approximations for a variety of obstacles with varying material properties, sizes and shapes;

Guidance on choosing Ground Coverage Ratio for the PV arrays;

Study Edge shading effects and forgo approximations widely used such as infinitely long rows;

Using the operating point calculations for each cell to arrive at Thermal model for cell temperature rise (for long term reliability);

Obstacle removal assessment for proposal and existing underperforming sites;

Detailed long-term degradation studies;

Guide operations and maintenance functions on performance for triage, preventative maintenance, and benchmarking sites;

Using Performance data and Model calculated data to train Artificial Intelligence models;

Calculating Net Present Value (NPV) of any PV system in detail;

Assess financial risk of a PV system project over lifetime operation;

Use as a tool for Scientific research of PV systems;

Study bi-facial technology for commercial viability;

Study effects of temperature, humidity, voltage bias and spectrum variability on module materials;

Assessment of lifetime safety hazards; and

Interface through API to Customer Relations Management (CRM) systems to assist sales pipeline, website-based access, and programmatic access via scriptable API end point.

In the above description of FIG. 1, and FIGS. 4-8, any processes, descriptions or blocks in flowcharts or workflows can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The various elements, features, and processes described herein may be used independently of one another, or may be combined in various ways. All possible combinations and sub-combinations are intended to fall within the scope of this disclosure.

Figure 9:
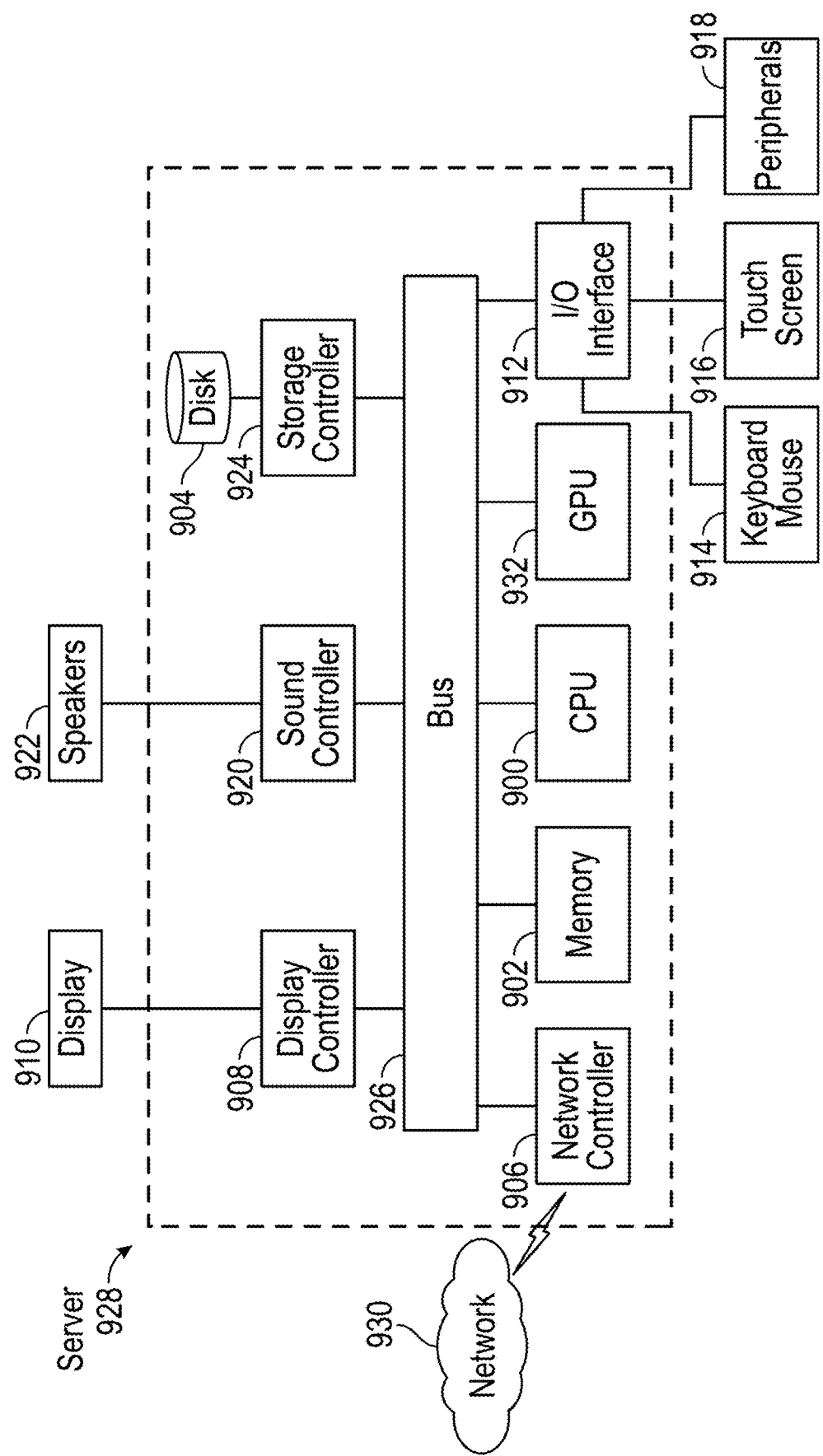
FIG. 9 is a hardware block diagram of a server according to one or more exemplary aspects of the disclosed subject matter.

Next, a hardware description of a server 928 configured to operate the framework 102 (and/or the architecture 600) according to exemplary embodiments is described with reference to FIG. 9. The server 928 can be a server, computer, laptop, smart phone, and the like. The hardware description described herein can also be a hardware description of any processing circuitry controlling any part of the system 100. In FIG. 9, the server 928 includes a CPU 900 and a GPU 932 which perform, either individually or in combination, one or more of the processes described herein. The process data and instructions may be stored in memory 902. These processes and instructions may also be stored on a storage medium disk 904 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the server 928 communicates, such as a server or computer.

Further, the claimed advancements may be provided as a utility application, background daemon, or component of an operating system, or combination thereof, executing in conjunction with CPU 900 and an operating system such as Microsoft Windows, UNIX, Solaris, LINUX, Apple MAC-OS and other systems known to those skilled in the art.

The hardware elements in order to achieve the server 928 may be realized by various circuitry elements. Further, each of the functions of the above described embodiments may be implemented by circuitry, which includes one or more processing circuits. A processing circuit includes a particularly programmed processor, for example, processor (CPU) 900, as shown in FIG. 9. A processing circuit also includes devices such as an application specific integrated circuit (ASIC) and conventional circuit components arranged to perform the recited functions.

In FIG. 9, the server 928 includes a CPU 900 which performs the processes described herein. Additionally, the GPU 932 can perform or assist in performing the processes described herein. The GPU 932 can be specialized electronic circuit designed to rapidly manipulate and alter memory. The highly parallel structure of a GPU makes them efficient for algorithms that process large blocks of data in parallel. The GPU can be present on a video card, embedded on a motherboard, or embedded in a CPU, for example. The server 928 may be a general-purpose computer or a particular, special-purpose machine. In one embodiment, the server 928 becomes a particular, special-purpose machine when the processor 900 and/or GPU 932 is programmed to perform an energy system evaluation (and in particular, any of the processes discussed with reference to FIGS. 1, and 4-8).

Alternatively, or additionally, the CPU 900 may be implemented on an FPGA, ASIC, PLD or using discrete logic circuits, as one of ordinary skill in the art would recognize. Further, CPU 900 and/or the GPU 932 may be implemented as multiple processors cooperatively working in parallel to perform the instructions of the inventive processes described herein.

The server 928 in FIG. 9 also includes a network controller 906, such as an Intel Ethernet PRO network interface card from Intel Corporation of America, for interfacing with network 930. As can be appreciated, the network 930 can be a public network, such as the Internet, or a private network such as an LAN or WAN network, or any combination thereof and can also include PSTN or ISDN sub-networks. The network 930 can also be wired, such as an Ethernet network, or can be wireless such as a cellular network including EDGE, 3G, 4G, and 5G wireless cellular systems. The wireless network can also be WiFi, Bluetooth, or any other wireless form of communication that is known.

The server 928 further includes a display controller 908, such as a graphics card or graphics adaptor for interfacing with display 910, such as a monitor. A general purpose I/O interface 912 interfaces with a keyboard and/or mouse 914 as well as a touch screen panel 916 on or separate from display 910. General purpose I/O interface also connects to a variety of peripherals 918 including printers and scanners.

A sound controller 920 is also provided in the server 928 to interface with speakers/microphone 922 thereby providing sounds and/or music.

The general purpose storage controller 924 connects the storage medium disk 904 with communication bus 926, which may be an ISA, EISA, VESA, PCI, or similar, for interconnecting all of the components of the server 928. A description of the general features and functionality of the display 910, keyboard and/or mouse 914, as well as the display controller 908, storage controller 924, network controller 906, sound controller 920, and general purpose I/O interface 912 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

Further, in one embodiment, the energy system evaluation (and in particular, any of the processes discussed with reference to FIGS. 1 and 4-8) can be performed using cloud-based computing (e.g., FIG. 10) as would be known by a person having ordinary skill in the art. More specifically, the processing may be performed using a serverless architecture for scalability. For example, cloud computing aggregates physical and virtual computation, storage, and network resources in the "cloud." Serverless computing offers a high level of computational abstraction, with increased scalability. Serverless computing works by uploading code to a serverless computing environment (or serverless computing platform or serverless environment), and the serverless computing environment executes the code. Additionally, the serverless computing environment can be event driven, meaning that the code can execute or perform some kind of computations triggered by events. In some cases, the code can be executed on demand, or according to a predetermined schedule. In a serverless computing environment, the user is abstracted from the setup and execution of the code in the networked hardware resources in the cloud.

In some cases, the serverless computing environments are virtualized computing environments having an application programming interface (API) which abstracts the user from the implementation and configuration of a service or application in the cloud. For example, the serverless computing system can provide representational state transfer (REST) APIs to invoke the monitoring agents to keep track of external events, so that users are able to execute their submitted tasks either via calling REST API (pushing events) or monitoring status of external resources with some interval (pulling events).

Figure 10:
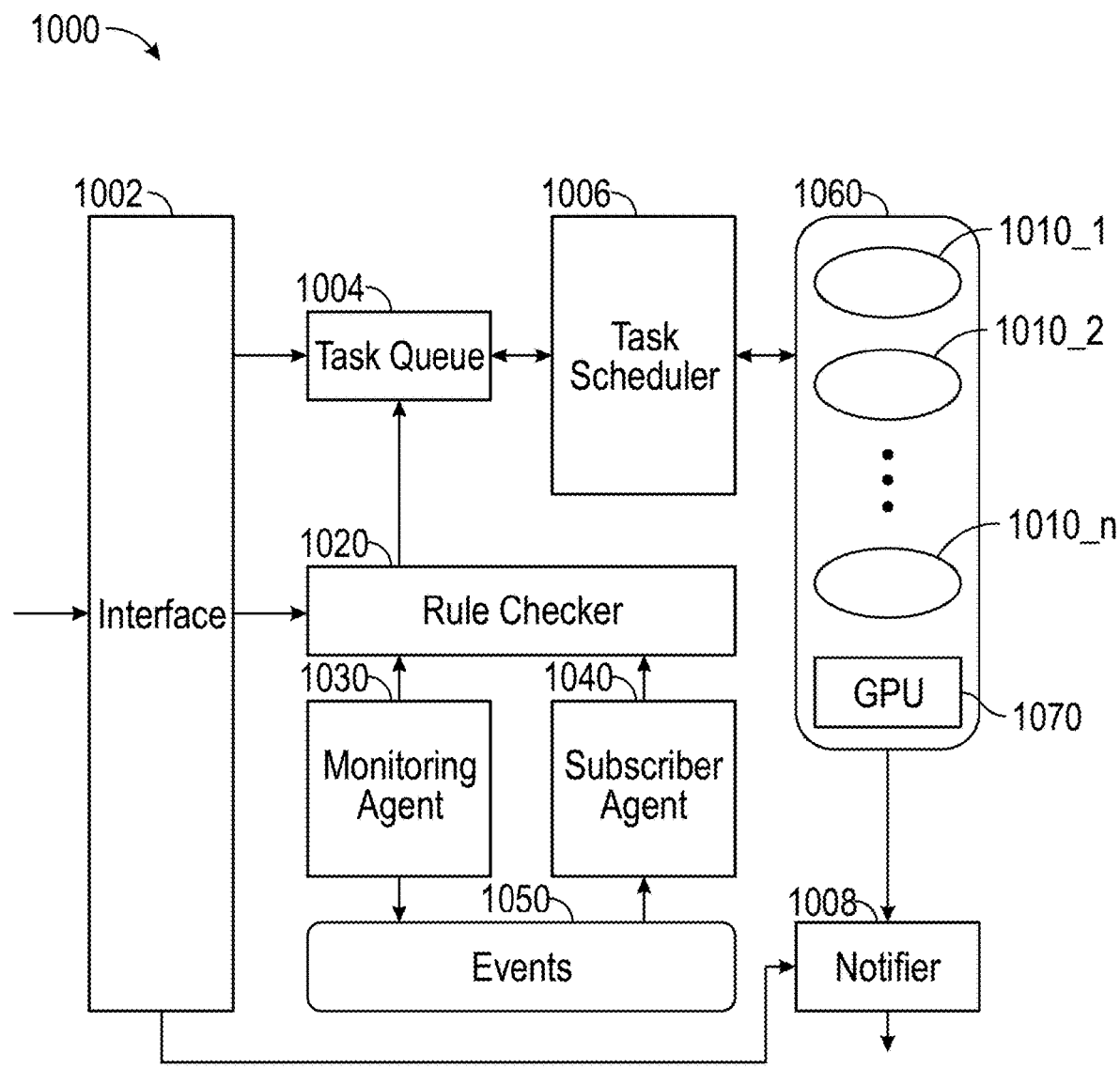
FIG. 10 illustrates an exemplary serverless computing system according to one or more aspects of the disclosure.

Referring to FIG. 10, FIG. 10 illustrates an exemplary serverless computing system 1000 according to one or more aspects of the disclosure. The system 1000 can be a virtualized set of the hardware resources in FIG. 9, for example. The system 1000 can include: an interface 1002, task queue 1004, task scheduler 1006, and networked hardware resources 1060 having hardware 1010_1, 1010_2, . . . 1010_N (e.g., computers, servers, processing circuitry, etc.) and a GPU 1070. The interface 1002 allows a developer or user (machine) to interact with the serverless computing system 1000 via a predefined API (e.g., the API 130). For example, the serverless computing system 1000 can be configured to perform an energy system evaluation (and in particular, any of the processes discussed with reference to FIGS. 1, 4, and 5). Via the interface 1002, a user can provide a task definition to create an action (associated with some piece of code) for the serverless computing system 1000 to execute. The interface 1002 can include a command line and/or a graphical user interface to facilitate the user interactions, such as inputting and specifying the task definition. The interface 1002 is an abstraction layer which would allow a developer or user to use different serverless computing environments deployed in the public cloud(s) and/or private cloud(s).

The GPU 1070 can be a virtualized GPU. For example, the GPU 1070 can be a virtualized GPU corresponding to the GPU 932. It should be appreciated that the GPU 1070 can represent one or more GPUs in the system 1000 such that the GPU 1070 can be one of the hardware 1010_1 . . . 1010_N of the networked hardware resources 1060.

Additionally, as an event-driven architecture, the serverless computing system 1000 can further include rule checker 1020, monitoring agent 1030 and/or subscriber manager 1040, and events 1050. The system 1000 can include more than one monitoring agent 1030. The system 1000 can include more than one subscriber agent 1030. The system 1000 can include more than one events (event sources) 1050. The serverless computing system 1000 can deal with both pull-type and push-type event driven workflows. Rule checker 1020 can receive rules (e.g., rule definitions) from a developer/user, and/or have predefined rules.

In some embodiments, the serverless computing system 1000 can include a notification system. The interface 1002 can accept notification definitions which requests notifier 1008 to output one or more notifications based on output(s) from any one or more of the workers 1010_1, 1010_2, . . . 1010_N. For instance, the success/failure/status from an execution of a task can be output to a developer/user by notifier 1008.

In one embodiment, an energy system evaluation framework includes processing circuitry configured to receive system configuration parameters relating to: a physical configuration of a solar array comprising a plurality of solar cells; one or more properties of the plurality of solar cells; and, an electrical circuit configuration of the solar array; calculate a cell level shade ratio for each of the plurality of solar cells based on the physical configuration of the solar array and the one or more properties of the plurality of solar cells; calculate an effective irradiance (Ee) for each of the plurality of solar cells in the solar array based on a corresponding cell level shade ratio; define an equivalent circuit model using the effective irradiance (Ee) for each cell; calculate a current-voltage (IV) and power-voltage (PV) characteristic for each cell based on the equivalent circuit model for each cell; aggregate the cell-level current-voltage (IV) and power-voltage (PV) characteristics for each cell according to the electrical circuit configuration of the solar array; calculate energy yield information for the energy system. Additionally, the processing circuitry can be configured to calculate an inverter-level Maximum Power Point ($P_{mp}$) based on the aggregated cell-level current-voltage (IV) and power-voltage (PV) characteristics; and, wherein calculating the energy yield information for the energy system comprises aggregating the inverter-level Maximum Power Point ($P_{mp}$).

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. A method for energy output evaluation of a photovoltaic (PV) system, comprising:
  querying a simulation application program interface (API) with PV system configuration parameters as arguments;
  generating a shade loss time series based on the system configuration parameters and a trained machine learning opto-electrical shade model, wherein generating the shade loss time series based on the trained machine learning opto-electrical shade model includes:
    receiving, at the trained machine learning opto-electrical shade model, an irradiance ratio for the PV system, wherein the irradiance ratio corresponds to a ratio of diffuse irradiance to plane of array irradiance, wherein the irradiance ratio is received from a weather model;
    receiving, at the trained machine learning opto-electrical shade model, a shade ratio for each sub-circuit of a solar module in the PV system; and
    generating, by the trained machine learning opto-electrical shade model, a module power based on the irradiance ratio and the shade ratio for each sub-circuit of the solar module;

simulating energy output for the PV system based on the shade loss time series; and outputting energy aggregations based on the simulation.

2. The method of claim 1, further comprising:

calculating bill savings based on the energy aggregations, a customer load profile, and applicable tariffs; and display the bill savings.

3. The method of claim 1, further comprising:

calculating a payback period based on the energy aggregations, a customer load profile, and applicable tariffs; and display the payback period.

4. The method of claim 1, wherein generating the shade loss time series further comprises:

requesting weather data from a weather API corresponding to a location of the PV system.

5. The method of claim 1, wherein training the machine learning opto-electrical shade model further comprises:

receiving an irradiance ratio, where in the irradiance ratio corresponds to a diffuse irradiance to plane of array irradiance ratio;

receiving a shade ratio for each sub-circuit in a solar module; and generating a training dataset based on the irradiance ratio and each shade ratio.

6. The method of claim 1, wherein simulating energy output for the PV system further comprises:

requesting an array layout of the PV system from a database; and triggering the simulation in response to requesting the array layout.

7. The method of claim 1, further comprising:

receiving the energy aggregations via a web-based business logic interface.

8. The method of claim 1, wherein the PV system configuration parameters include a PV system location, a solar panel array layout, and solar cell string level shade ratios.

9. The method of claim 8, wherein the shade loss time series is an array layout specific weather timeseries based on the PV system configuration parameters.

10. One or more computer readable medium including computer program instructions, which when executed by an information processing system, cause the system to:

querying a simulation application program interface) with PV system configuration parameters as arguments;

generating a shade loss time series based on the system configuration parameters and a trained machine learning opto-electrical shade model, wherein generating the shade loss time series based on the trained machine learning opto-electrical shade model includes;

receiving, at the trained machine learning opto-electrical shade model, an irradiance ratio for the PV system, wherein the irradiance ratio corresponds to a ratio of diffuse irradiance to plane of array irradiance, wherein the irradiance ratio is received from a weather model;

receiving, at the trained machine learning opto-electrical shade model, a shade ratio for each sub-circuit of a solar module in the PV system; and generating, by the trained machine learning opto-electrical shade model, a module power based on the irradiance ratio and the shade ratio for each sub-circuit of the solar module;

simulating energy output for the PV system based on the shade loss time series; and outputting energy aggregations based on the simulation.

11. The one or more computer readable medium of claim 10, wherein the information processing system is a server.

12. The one or more computer readable medium of claim 10, wherein the information processing system is a cloud-based architecture.

13. A method for energy evaluation of an energy system, comprising:

receiving system configuration parameters from a third-party as a request to an Application Program Interface (API);

passing the system configuration parameters to an energy system evaluation framework, wherein passing the system configuration parameters to the energy system evaluation framework includes;

querying a simulation API with the system configuration parameters as arguments;

generating, by the framework, a shade loss time series based on the system configuration parameters and a trained machine learning opto-electrical shade model, wherein generating the shade loss time series based on the trained machine learning opto-electrical shade model includes;

receiving, at the trained machine learning opto-electrical shade model, an irradiance ratio for the PV system, wherein the irradiance ratio corresponds to a ratio of diffuse irradiance to plane of array irradiance, wherein the irradiance ratio is received from a weather model;

receiving, at the trained machine learning opto-electrical shade model, a shade ratio for each sub-circuit of a solar module in the PV system; and generating, by the trained machine learning opto-electrical shade model, a module power based on the irradiance ratio and the shade ratio for each sub-circuit of the solar module;

simulating, by the framework, energy output for the PV system based on the shade loss time series; and outputting, by the framework, energy aggregations based on the simulation;

receiving energy yield information for the energy system based on the system configuration parameters; and outputting energy yield information to the third-party.

14. The method of claim 13, further comprising:

receiving system configuration parameters for an energy system from an Application Program Interface (API);

generating a 3D site geometry based on the system configuration parameters;

calculating an effective irradiance (Ee) for photovoltaic (PV) modules;

calculating inverter-level Maximum Power Point ($P_{mp}$);

adjusting the $P_{mp}$ to comply with grid integration requirements;

calculating energy yield information for the energy system; and returning the energy yield information to the API.

15. The method of claim 14, wherein the Ee for each cell in PV modules across the energy system is calculated using cell shade ratios and a weather data model, the weather data model including highly localized components of irradiance and cell temperatures based on a location of the energy system.

16. The method of claim 14, wherein the inverter-level $P_{mp}$) is calculated using an electrical Maximum Power Point Tracking (MPPT) model.

17. The method of claim 13, wherein the energy yield information corresponds to an energy yield of the energy system over a predetermined time interval.

18. The method of claim 13, wherein the third party can be one or more of a website, a customer relations management tool, a third-party tool, and one or more individual users.

* * * * *